(12) United States Patent  
Hattori et al.

(10) Patent No.: US 7,758,116 B2  
(45) Date of Patent: Jul. 20, 2010

(54) MONITOR UNIT FOR A VEHICLE SEAT

(75) Inventors: Tsunetoshi Hattori, Nagoya (JP); Shoei Shinoda, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 268 days.

(21) Appl. No.: 12/034,137

(22) Filed: Feb. 20, 2008

(65) Prior Publication Data

US 2008/0203788 A1 Aug. 28, 2008

(30) Foreign Application Priority Data

Feb. 23, 2007 (JP) .............................. 2007-043628
Feb. 23, 2007 (JP) .............................. 2007-043629

(51) Int. Cl.
 A47C 7/72 (2006.01)
 A47C 7/38 (2006.01)
 B60N 2/48 (2006.01)
(52) U.S. Cl. ..................... 297/217.3; 297/408; 348/837
(58) Field of Classification Search .................. 297/61, 297/217.3, 217.4, 217.6, 403, 408; 348/837
 See application file for complete search history.

(56) References Cited

U.S. PATENT DOCUMENTS

| 4,376,552 A | * | 3/1983 | Pilhall ........................ 297/391 |
| 4,536,027 A | * | 8/1985 | Brennan ..................... 297/124 |
| 4,720,146 A | * | 1/1988 | Mawbey et al. ............. 297/409 |
| 5,145,233 A | * | 9/1992 | Nagashima ................. 297/408 |
| 5,590,933 A | * | 1/1997 | Andersson .................. 297/408 |
| 6,698,832 B2 | | 3/2004 | Boudinot |
| 6,871,356 B2 | * | 3/2005 | Chang ........................... 725/75 |
| 6,994,236 B2 | * | 2/2006 | Hsu ............................ 224/275 |
| 7,070,240 B2 | * | 7/2006 | Schmitt et al. .............. 297/410 |
| 7,399,033 B2 | * | 7/2008 | Hsiao ...................... 297/217.3 |
| 7,637,565 B2 | * | 12/2009 | Kuno et al. .............. 297/217.3 |
| 2005/0196152 A1 | | 9/2005 | Chen et al. |

FOREIGN PATENT DOCUMENTS

| JP | 405-329035 | * | 12/1993 |
| JP | 2002-2395 | | 1/2002 |
| JP | 2005-251367 | | 9/2005 |
| JP | 2008-99782 | * | 5/2008 |

OTHER PUBLICATIONS

English language Abstract of JP 2002-2395.
English language Abstract of JP 2005-251367.

* cited by examiner

*Primary Examiner*—Joseph F Edell
(74) *Attorney, Agent, or Firm*—Greenblum & Bernstein P.L.C.

(57) ABSTRACT

The present invention can include a monitor unit for a vehicle seat including a base portion positioned at a top of a seat back; and a monitor portion including a monitor with a display surface for displaying images. The monitor portion is pivotally connected to the base portion via a hinge and rotatable in a front and rear direction between a use position at which the monitor portion is erect on the base portion and the display surface is positioned in a rear direction, and a retracted position at which the monitor portion is positioned in a front direction around the hinge. The hinge is positioned between the base portion and the monitor portion and at a front end of the base portion, and the monitor portion can be rotated by at least 90 degrees from the use position.

16 Claims, 6 Drawing Sheets

MONITOR UNIT FOR A VEHICLE SEAT

BACKGROUND OF THE INVENTION

The present invention relates to a monitor unit for a vehicle seat, which is attached to the top portion of the seat back of a vehicle seat, and whose display surface is directed to the rear of the vehicle during use.

A monitor unit of this type is disclosed in U.S. Pat. No. 6,698,832. This monitor unit includes a base portion installed at a top of a seat back and a monitor portion building therein a monitor with its display surface exposed to an exterior. The monitor portion is pivotally connected to the base portion via a hinge, and is rotatable in a front/rear direction of the vehicle between a use position (in which it is kept erect on the base portion, with its display surface being directed to a rear of the vehicle), and a retracted position (in which it has been tilted toward a front side of the vehicle around the hinge). In the use position, the monitor portion is situated on a rear surface of a headrest, with the display surface being directed to the rear of the vehicle. When placing the unit in the retracted position, the headrest is detached from the seat back, and the monitor portion is tilted toward the front side of the vehicle by 90 degrees around the hinge, which is arranged at the rear end of the base portion. In the retracted position, the monitor portion is laid horizontally on the base portion. The monitor portion includes a housing portion surrounding an outer periphery of the monitor, with the display surface being exposed, and a support portion provided upright on the base portion and supporting the monitor within a housing portion on both right and left sides thereof. Hinges are provided at right and left top portions of the support portion, and a substantially middle portion in a vertical direction of the housing portion is pivoted to the support portion via the hinges. The angle of the housing portion can be adjusted with respect to the support portion using the hinges at the top of the support portion as rotation shafts thereof.

However, in the retracted position of the monitor unit, the monitor portion is simply tilted by 90 degrees. This means that the monitor portion is on the base portion even in the retracted position, so a thickness of the monitor portion constitutes an obstruction. At the same time, an upper portion of the monitor portion protrudes to the front side of the seat back. As a result, an amount by which the monitor portion protrudes to the front side of the seat back increases as a height of the monitor portion increases, which also leads to an obstruction. A way to solve this problem would be to reduce thickness and height dimensions of the monitor portion. However, from a technical viewpoint, there is a limitation to a reduction in thickness of the monitor portion. A reduction in height dimension of the monitor portion results in a reduction in an area of the monitor display surface, making an image displayed rather hard to see. To begin with, as long as the monitor portion is laid flat on the base portion in the retracted state, no radical solution of the problem will be possible.

Further, the right and left side portions of an interior of the housing portion which constitutes the monitor portion are rotatably supported by the support portion via the hinges. As a result, the width dimension of the housing portion must be at least not less than the dimension by which the support portion having the hinges protrudes outwardly to the right and left from the monitor. When considered in relation to the headrest, there is a limitation to the size of the monitor unit as a whole, so when the width dimension of the housing portion increases, the area of the display surface of the monitor becomes much smaller. Further, when adjusting the angle of the housing portion, there is generated a gap between the housing portion and the base portion, and no member is provided in particular for a purpose of covering this gap. This leads to a rather poor outward appearance, an easy intrusion of dust, and a fear of the fingers of an operator to be caught during rotating operation. At the same time, an upper portion of the housing portion is displaced to the front side of the vehicle where the headrest exists. Thus, it is necessary to provide within the headrest a space at least corresponding to a displacement of the upper portion of the housing portion, resulting in a reduction in degree of freedom in terms of a design of the headrest.

Apart from this, examples of a monitor unit to be arranged on the back surface of a seat back or a headrest, with its display surface being directed to the rear of the vehicle, are disclosed in JP 2002-2395 A and JP 2005-251367 A. In those examples, the monitor portion is rotatably supported so as to allow angle adjustment with respect to a support portion; however, there is no mechanism allowing displacement between the use position and the retracted position.

BRIEF SUMMARY OF THE INVENTION

A monitor unit for a vehicle seat according to the present invention can includes: a base portion positioned at a top of a seat back; and a monitor portion including a monitor with a display surface for displaying images, in which the monitor portion is pivotally connected to the base portion via a hinge and rotatable in a front and rear direction between a use position at which the monitor portion is erect on the base portion and the display surface being directed to a rear direction, and a retracted position at which the monitor portion has been tilted toward a front direction around the hinge, in which the hinge is positioned at a front end of the base portion, in which the monitor portion can be rotated by 90 degrees or more from the use position, and in which the monitor portion hangs down forward than a hinge when the monitor portion is in the retracted position.

The monitor portion is arranged, with the displaced surface being directed to the rear of the vehicle, so the front surface of the monitor unit (having a display surface) corresponds to the vehicle-rear-side surface. Similarly, the rear surface of the monitor unit corresponds to the vehicle-front-side surface on the opposite side of the display surface. In this context, in the following description, the term "front surface" means the vehicle-rear-side surface, and the term "rear surface" means the vehicle-front-side surface. Further, the term "front side" literally means the front side of the vehicle, and the term "rear side" literally means the rear side of the vehicle.

When the hinge serving as the rotation shaft for the monitor portion is provided at the front end of the base portion, the monitor portion can be rotated by 90 degrees or more without coming into contact with the base portion when it is to be forwardly tilted to the retracted position. If, when the monitor portion is tilted forwardly to the retracted position, the monitor portion hangs at a position on the vehicle front side of the hinge, nothing exists on the base portion. As a result, the upper portion of the seat back is visually simplified. Thus, it is possible to secure a wide front field of view for the passenger seated on the rear seat. When the monitor portion hangs, the amount by which it protrudes forwards from the seat back is reduced, and it is possible to retract the monitor portion as compactly as possible while preventing from becoming an obstruction.

In an example of the construction in which the monitor portion hangs in the retracted position, the front-rear length of the base portion is substantially the same as or somewhat smaller than the front-rear length of the top portion of the seat back, with the monitor portion hanging obliquely downwards while in contact with the front surface of the seat back. Alternatively, the front end portion of the base portion is caused to protrude forwardly to some degree from the front end of the top portion of the seat back, with the monitor portion being kept suspended in the air without being held in contact with the front surface of the seat back. Further, in an example of the construction in which the monitor portion hangs obliquely downwards while in contact with the front surface of the seat back, a part of the back surface of the flat monitor portion is kept in contact with the front surface of the seat back. In an example of the construction in which the monitor portion is kept suspended in the air without being kept in contact with the front surface of the seat back, the front-rear length of the base portion is larger than the front-rear length of the seat back top portion; and, in another example, while the front-rear length of the base portion is substantially the same as the front-rear length of the top portion of the seat back, the base portion is arranged at the top of the seat back while shifted to the front side of the vehicle.

In this way, various designs are possible regarding the retracted position of the monitor portion; above all, so that the rear surface of the monitor portion may be held in contact with the front surface of the seat back while in conformity therewith when the monitor portion is tilted forwards to the retracted position, it is desirable that the rear surface of the monitor portion be formed in the same protruding and recessed configuration as that of the front surface of the seat back. This enables the monitor unit to be retracted efficiently and compactly without generating any useless gap between the monitor portion and the seat back.

In this connection, it is desirable for the display surface of the monitor portion to be substantially vertical. When the display surface, that is, the front surface of the monitor portion, is substantially vertical, the monitor units protrudes forward from the seat back only by an amount corresponding to the thickness of the monitor portion. That is, it is possible to minimize the amount by which the monitor portion protrudes from the front surface of the seat back, so the monitor unit in the retracted position can be made more compact. Thus, for example, in the state in which the monitor unit has been retracted, when large baggage is placed on the seat cushion, the monitor unit does not constitute an obstruction, thus making it possible to place the baggage in a stable manner. Although it depends on the configuration of the monitor portion, as long as the display surface is substantially vertical, the monitor portion itself may be inclined.

The monitor portion may include a support portion supporting the monitor from behind and rotatable with respect to the base portion, and a housing portion building therein the monitor, with the display surface of the monitor being exposed to the exterior. In this case, it is desirable for the housing portion to be pivoted about the support portion via a hinge which is different from the hinge existing between the base portion and the support portion and to be rotatable in the vehicle front-rear direction with respect to the support portion. The hinge existing between the housing portion and the support portion is provided on the rear surface of the housing portion such that it does not protrude outwards from the right and left ends of the housing portion. In this construction, there exists no support portion on either the right or left side of the housing portion. Thus, even when there is a limitation on the size of the monitor unit itself in relation to the headrest, etc., it is possible to maximize the size of the housing portion with respect to the size of the monitor unit as a whole. The area of the display surface can also be enlarged, whereby the displayed image is easier to see, and an improved outward appearance is attained.

It is desirable for the hinge existing between the support portion and the housing portion to be provided on the upper portion of the rear surface of the housing portion. This allows the lower portion of the housing portion to be greatly displaced with respect to the base portion. In contrast, the upper portion of the housing portion is scarcely displaced to protrude to the rear side (vehicle front side), so there is no need to secure a surplus space in the headrest, thereby achieving an improvement in terms of degree of freedom in design. On the other hand, when the lower portion of the housing portion is displaced to the front side (vehicle rear side), a gap is generated between the support portion and the housing portion. In view of this, it is desirable to provide the housing portion with a lower surface cover for covering the gap between the support portion and the housing portion generated through rotation of the housing portion. This helps to prevent the interior of the monitor unit from being visually recognized through the gap between the support portion and the housing portion, thus achieving an improvement in terms of outward appearance. Further, it effectively prevents intrusion of dust, and makes it possible to protect the operator's finger from being caught at the time of rotating operation.

The lower surface cover may be formed by a plurality of plate members. In this case, when retracting the monitor unit, the lower surface cover members are superimposed one upon the other. And, as the housing portion rotates, the lower surface cover members are successively drawn out, and it is desirable that, when the housing portion is rotated to the rotation limit, the lower surface cover members be arranged side by side in the front-rear direction. This makes it possible to cover a large gap while accommodating the lower surface cover members in a compact fashion in the limited accommodation space. In the construction in which the lower surface cover members are successively drawn out, a smaller gap can be covered with a part of the lower surface cover members, and a larger gap can be covered with all the lower surface cover members arranged side by side, thereby achieving an improvement in terms of functionality.

The vehicle seat allows attachment of the headrest such that the monitor unit is covered from above except for the display surface of the monitor unit. When the headrest is attached to the vehicle seat, the upper portion of the front surface of the monitor portion is covered with the headrest. In view of this, it is desirable for the upper portion of the front surface of the monitor portion superimposed on the headrest to be formed in a configuration in conformity with the configuration of the inner peripheral surface of the headrest opposed thereto. This causes the upper portion of the front surface of the monitor portion to rotate along the inner peripheral surface of the headrest. Thus, no useless gap is generated between the monitor portion and the headrest, thereby achieving an improvement in terms of outward appearance. Nor is there any need to provide the corresponding portion with a cover member or the like for covering a gap, so it is possible to avoid an increase in the number of components. Further, since the monitor portion and the headrest do not interfere with each other, smooth rotation is possible, thus providing a satisfactory functionality.

Further, the housing portion is rotatable with respect to the support portion along an upper surface of the base portion, so it is desirable that the upper surface of the base portion and a lower surface of the housing portion be formed substantially in the same configuration.

It is possible to configure, on a rear surface side of the monitor unit, an upper portion of the housing portion to cover an upper portion of the support portion so as to be superimposed thereon in the front and rear direction. With this configuration, the portions of the housing portion and the support portion superimposed one upon the other abut each other to thereby determine a rotation limit for the housing portion with respect to the support portion.

In a case in which cutouts capable of accommodating the lower surface cover are formed in right and left side walls of the housing portion, it is desirable that the cutouts have allowance spaces helping to avoid contact of the housing portion with an inner frame of the support portion when the housing portion is inclined to the rotation limit.

When there are provided two lower surface cover members, it is desirable to form a guide groove in one lower surface cover member and to form in the other lower surface cover member an engagement protrusion to be engaged with the guide groove. In this construction, when the housing portion is rotated with respect to the support portion, when the housing portion is rotated with respect to the support portion, the two lower surface cover member s are successively drawn out with the rotation of the housing portion, with the engagement protrusion sliding in the guide groove.

In the case in which the lower surface cover members are accommodated in the upper portion of the inner frame of the support portion, it is desirable to form a downwardly protruding restricting member at the vehicle front side edge of the lower surface cover stacked on the lower side and to form an upwardly protruding restricting member at the vehicle rear side edge of the inner frame of the support portion. With this construction, the rotation of the housing portion can be reliably limited by the restricting member of the lower surface cover stacked on the lower side and the restricting member of the inner frame.

It is desirable that an operating portion for rotating the housing portion be formed in a lower portion of the housing portion.

On the rear surface of the housing portion, the portion covering the hinge serving as the rotation shaft with respect to the support portion is formed as a swollen portion that extends toward the vehicle front side. The headrest allows adjustment of its height as measured from the seat back top portion. The headrest is provided with a shield plate which, when the headrest is fixed in position in a state in which it is raised upwardly by a predetermined amount from the monitor unit, shields the inner structure of the headrest between the upper surface of the monitor unit and the upper surface of the headrest. In the case of this construction, it is desirable for the shield plate to be provided with a recess. With this construction, when the headrest is attached to the seat back, the swollen portion of the rear surface of the housing portion is accommodated in the recess, and smooth rotating operation is possible without interference of the housing portion with the shield plate.

After forming, to a stay for attaching the headrest to the seat back, a plurality of vertically arranged step portions in the form of recesses, it is desirable to provide a button allowing setting of the height position of the headrest through engagement with the step portions of the stay.

DETAILED DESCRIPTION OF THE INVENTION

Figure 1:
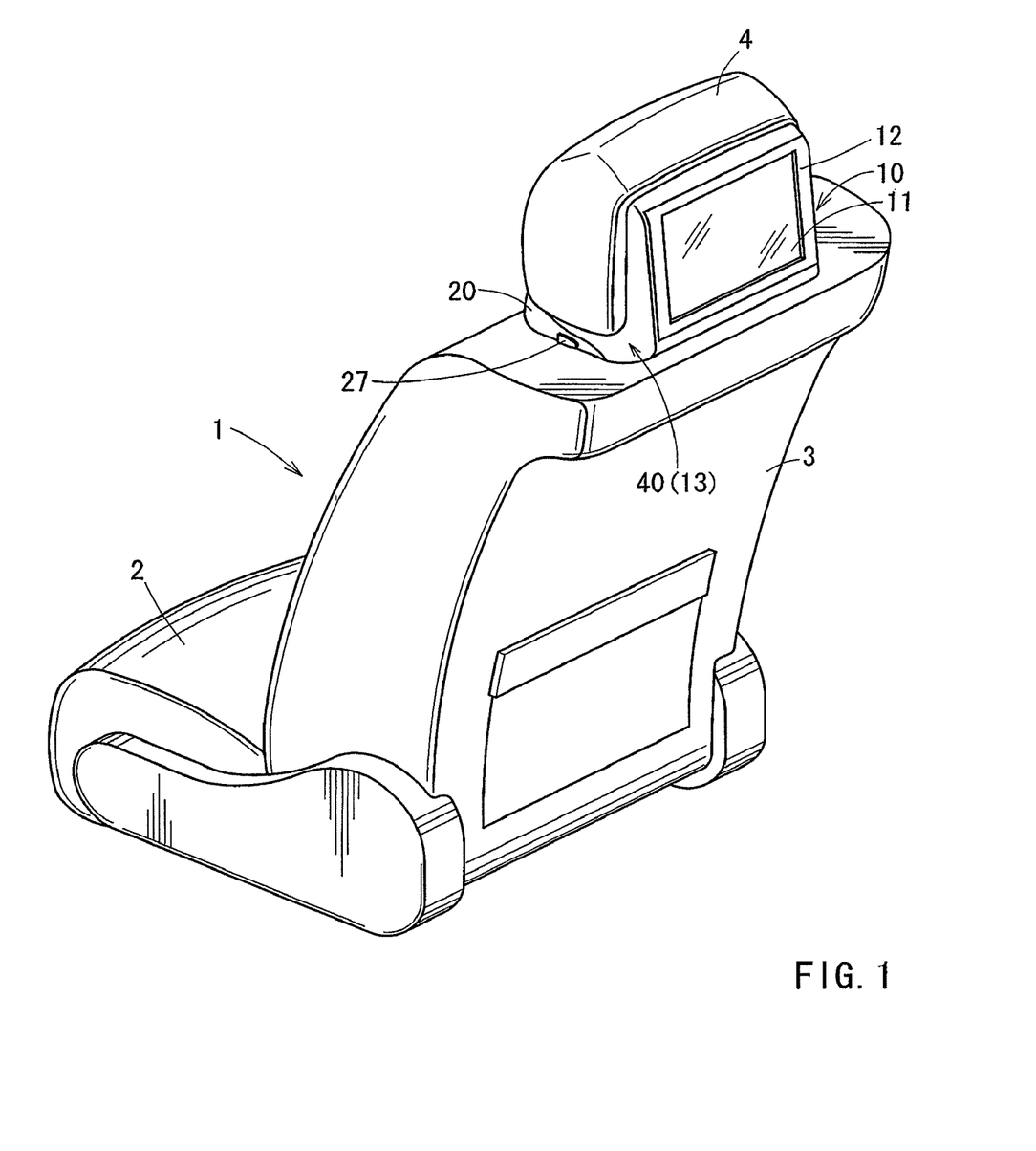
FIG. 1 A rear perspective view of a vehicle seat.
Figure 2:
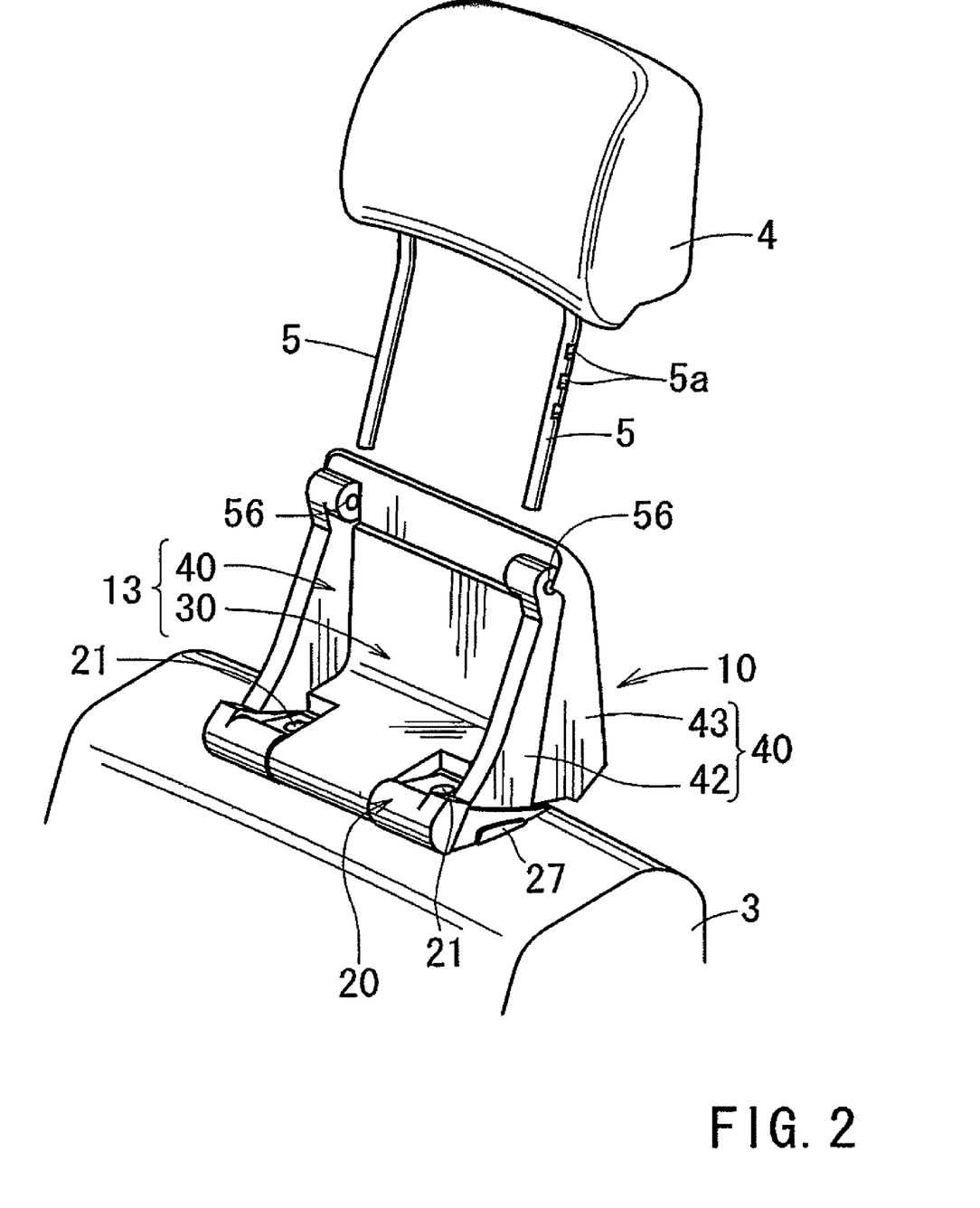
FIG. 2 A front perspective view of the vehicle seat with the headrest removed from the seat back.

As shown in FIG. 1, a seat 1 includes a monitor unit 10-on a seat for use in a vehicle such as an automobile, and has a seat cushion 2 as a seating portion, a seat back 3 as a backrest, and a headrest 4 supporting the head of the passenger. The monitor unit 10 is arranged at the top portion (upper end) of the seat back 3. The headrest 4 is detachable with respect to the seat back 3. As shown in FIG. 2, the headrest 4 is attached to the seat back 3 from above the monitor unit 10 so as to cover the same. The monitor unit 10 exists between the seat back 3 and the headrest 4, with a display surface 11 thereof for displaying images being exposed on the rear surface of the headrest 4. As a result, the passenger can visually recognize the image on the monitor unit 10 from the vehicle rear side.

Figure 3:
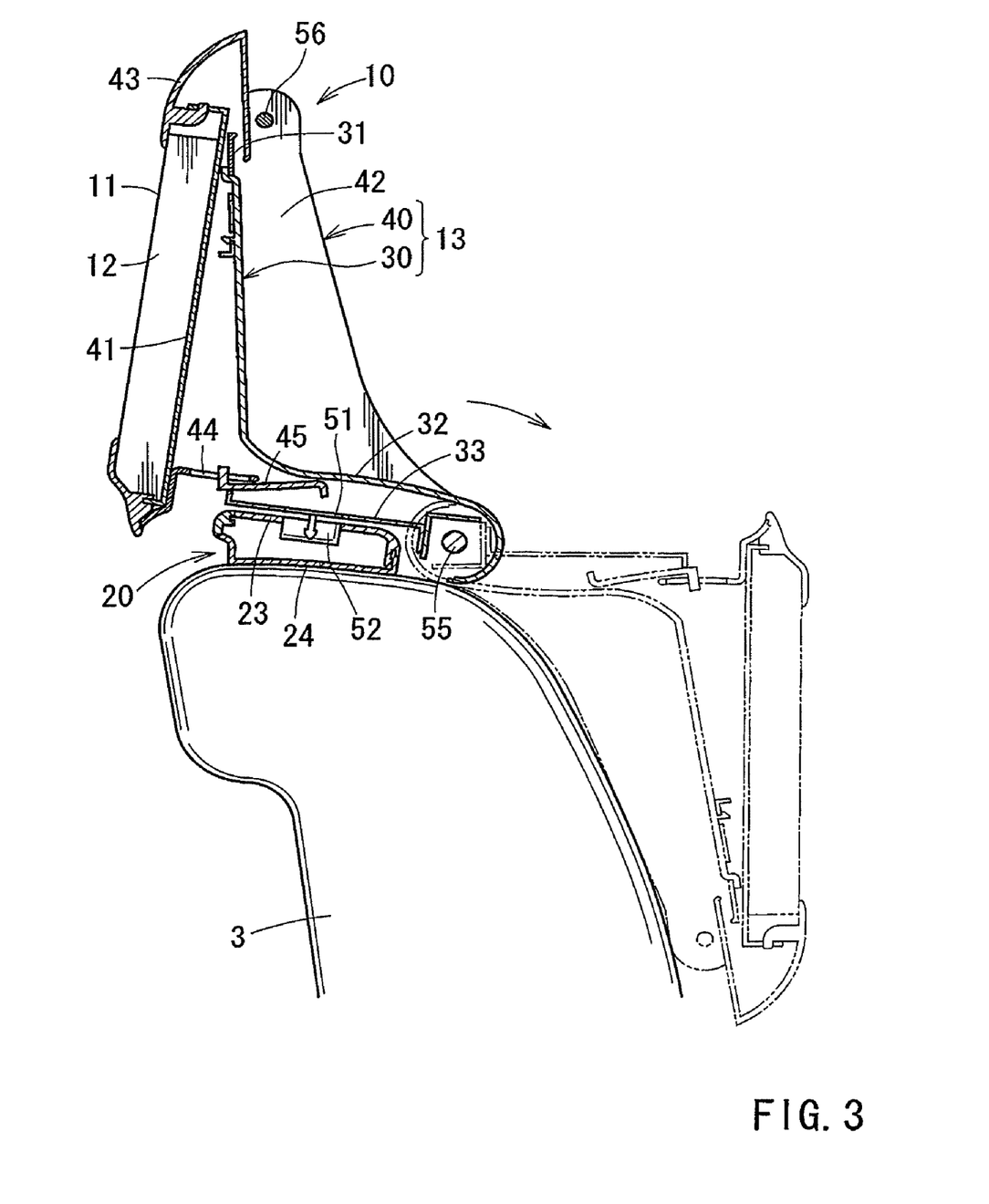
FIG. 3 A side sectional view showing a monitor unit in a use position and in a retracted position.
Figure 4:
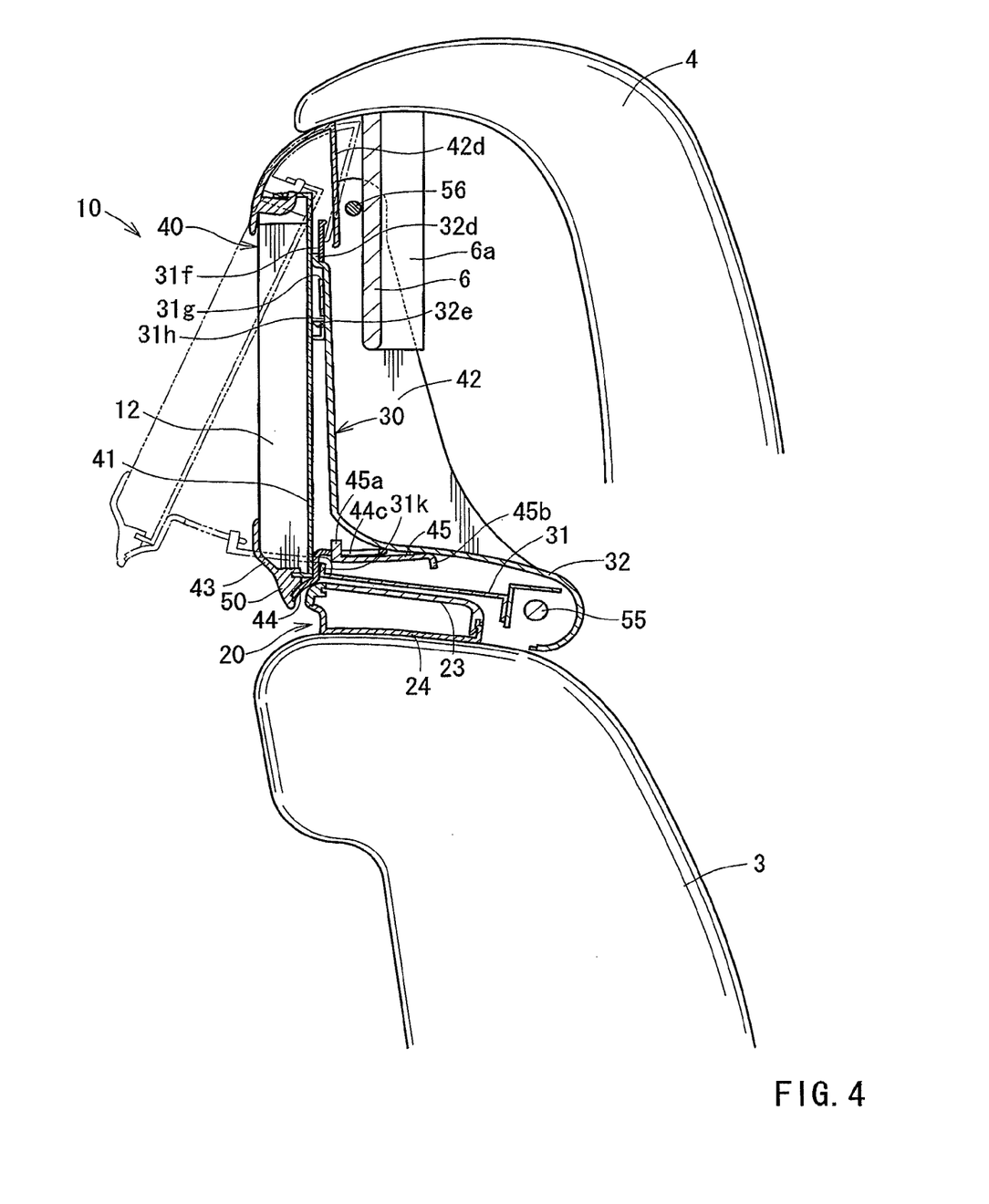
FIG. 4 A side sectional view of an angle adjusting mechanism of a housing portion.

As shown in FIGS. 1 and 2, the monitor unit 10 has a base portion 20 installed at the top of the seat back 3 and a monitor portion 13 including a monitor 12 with the display surface 11 thereof exposed. The headrest 4 can be attached to the upper portion of the monitor unit 10 by inserting two right and left stays 5 respectively into right and left insertion holes 21 provided at predetermined positions of the base portion 20. As shown in FIG. 3, the monitor portion 13 is pivoted to the base portion 20 by a hinge shaft 55, and is rotatable between a use position (indicated by solid lines), in which it is erect on the base portion 20 and in which the display surface 11 is directed to the rear of the vehicle, and a retracted position (indicated by phantom lines), in which it has been tilted to the vehicle front side around the hinge shaft 55. In FIGS. 3 and 4, the left-hand side corresponds to the vehicle rear side, and the right-hand side corresponds to the vehicle front side.

Further, the monitor portion 13 rotates around the hinge shaft 55 with respect to the base portion 20, and includes a support portion 30 supporting the monitor 12 from behind and a housing portion 40 including the monitor 12 with the display surface 11 of the monitor 11 exposed. The housing portion 40 is pivot ally connected to the support portion 30 by hinge shafts 56 arranged in the upper portion of the rear surface thereof, and is rotatable in the vehicle front-rear direction with respect to the support portion 30. The lower portion of the housing portion 40 is able to be displaced in the vehicle front-rear direction with respect to the base portion 20, whereby the angle of the display surface 11 can be adjusted. The vehicle rear side surface where the display surface 11 is exposed and constitutes the front surface of the monitor unit 10. Further, the surface on the opposite side covered with the headrest 4 constitutes the rear surface of the monitor unit 10.

Figure 5:
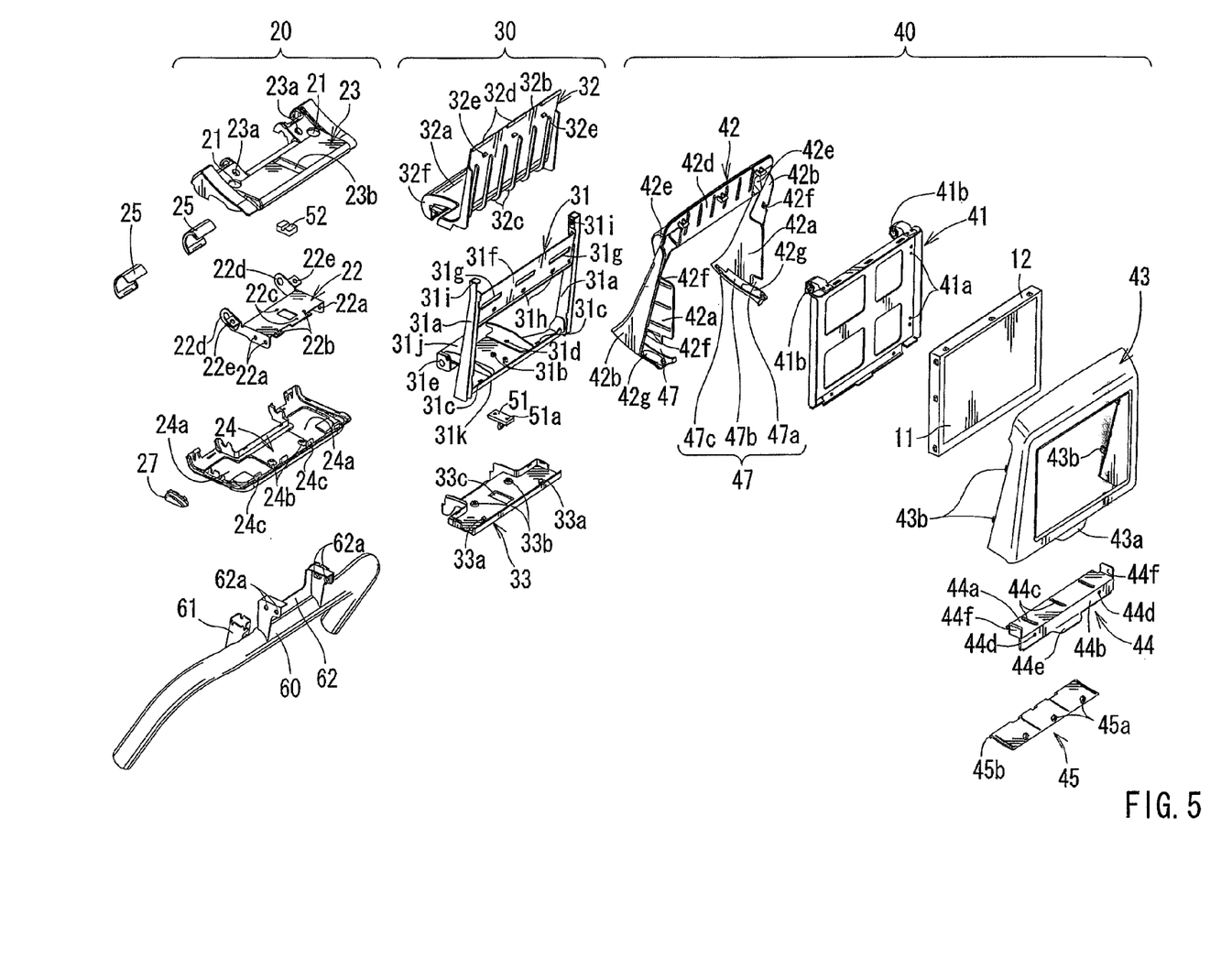
FIG. 5 An exploded perspective view of the monitor unit.

As shown in FIG. 5, the base portion 20 includes a base frame 22 formed of metal, an upper surface cover 23 and a lower surface cover 24 respectively sandwiching it from above and below, two hinge covers 25 arranged on the rear surface of the base portion 20, and a button 27 for locking/unlocking the headrest 4. Except for the base frame 22, the other components can be formed by molding of a synthetic resin. The support portion 30 constituting the monitor portion 13 includes a support frame 31 formed of metal and pivoted to the base frame 22, an L-shaped cover 32 of a substantially L-shaped sectional configuration covering the upper surface and the rear surface 6f the support frame 31, and a lower surface cover 33 covering the lower surface of the support frame 31. The L-shaped cover 32 and the lower surface cover 33 are synthetic resin moldings. The housing portion 40 constituting the monitor portion 13 includes a metal bracket 41 pivoted to the support frame 31 and used to fix the monitor 12 in position, a rear surface cover 42 attached to the rear surface of the bracket 41 while covering right and left pillars 31a of the support frame 31, a front surface cover 43 covering the bracket 41 and the monitor 12 with the display surface 11 of the monitor 12 exposed, and two lower surface covers 44 and 45 covering the lower surface of the monitor 12. Except for the bracket 41 and the monitor 12, the other components can be synthetic resin moldings.

Further, the base portion 20 and the monitor portion 13 are provided with a retaining means for retaining the monitor portion 13 in the use position. In this instance, retaining can mean providing a fit-engagement receiving member 52 on the base portion 20 and a fit-engagement pin 51 on the monitor component 13. When the monitor portion 13 is set erect on the base portion 20, the fit-engagement pin 51 is fit-engaged with the fit-engagement receiving member 52, whereby the use position of the monitor portion 13 is maintained. Reference numeral 60 indicates a metal inner frame arranged inside the seat back 3. At the top of the inner frame 60, there are provided two right and left holders 61 through which the stays 5 of the headrest 4 are passed. Between the holders 61 and at the lateral center of the top portion of the inner frame 60, there is provided a base bracket 62 for fixing the base portion 20 of the monitor unit 10 in position. The base bracket 62 is formed as an upwardly directed fork-like member.

The construction of the monitor unit 10 will be described. In the base portion 20, the base frame 22 and the lower surface cover 24 are fastened together by screws by means of screw holes 22b and 24b, respectively. The fit-engagement receiving member 52 is previously fixed to the base frame 22 by means of screw holes 22c. The holders 61 and the legs of the base bracket 62 of the inner frame 60 are passed through relatively large right and left fixation holes 24a, respectively, of the lower surface cover 24. In this state, positioning is performed on the base frame 22 with respect to the base bracket 62, and the base frame 22 and the base bracket 62 are fastened together by screws at screw holes 22a and 62a, respectively. The button 27 is mounted to the side surface of the lower surface cover 24 through the intermediation of a spring (not shown), and then the upper surface cover 23 is placed on the base frame 22, respectively. The base frame 22 and the upper surface cover 23 are fastened together by screws at screw holes 22e and 23a, respectively. Pit-engagement protrusions 24c of the lower surface cover 24 are fit-engaged with fit-engagement holes (not shown) of the upper surface cover 23 to thereby fix the upper surface cover 23 and the lower surface cover 24 to each other, whereby the base portion 20 is fixed to the top portion of the seat back 3. At this time, right and left insertion holes 21 of the upper surface cover 23 are opposed to the right and left holders 61 of the inner frame 60, respectively. The right and left stays 5 of the headrest 4 can be passed through the holders 61 via the insertion holes 21.

Regarding the support portion 30, the fit-engagement pin 51 is previously fastened from the lower surface of the support frame 31 at screw holes 31b and 51a. Fit-engagement protrusions 33a of the lower surface cover 33 are fit-engaged with fit-engagement holes 31c of the support frame 31, and then the lower surface cover 33 and the support frame 31 are fastened together by screws at screw holes 33b and 31d. At this time, the fit-engagement pin 51 is exposed to the exterior through an opening 33c of the lower surface cover 33. The cover 32 is mounted to the support frame 31 from behind. The cover 32 is a component having a substantially L-shaped sectional configuration including a horizontal plate portion 32a, a vertical plate portion 32b (provided upright at the rear end of the horizontal plate portion 32a), and a semi-circular-bag-like hinge cover portion 32f (formed integrally to extend backwards from the front end of the horizontal plate portion 32a). Reference numeral 32c indicates a plurality of reinforcement ribs arranged side by side to extend from the front surface of the vertical plate portion 32b to the lower surface of the horizontal plate portion 32a. The upper portions of the right and left pillars 31a of the support frame 31 are bridged by a stay 31f. In an oblique attitude, in which the front end of the horizontal plate portion 32a of the L-shaped cover 32 is raised, fit-engagement members 32d of the L-shaped cover 32 are fit-engaged with fit-engagement holes 31g of the stay 31f of the support frame 31. While bringing the horizontal plate portion 32a back to the horizontal position, fit-engagement protrusions 32e of the L-shaped cover 32 are fit-engaged with fit-engagement holes 31h of the support frame 31. As a result, the L-shaped cover 32 is fixed to the support frame 31. At this time, the hinge cover portion 32f of the L-shaped cover 32 covers a hinge portion 31e of the support frame 31. Thus, the hinge shaft 55 existing between the base portion 20 and the monitor portion 13 (support portion 30) cannot be visually recognized from outside. The lateral width dimension of the horizontal plate portion 32a and the hinge cover portion 32f of the L-shaped cover 32 is set to be approximately one size larger than that of the hinge portion 31e of the support frame 31.

Regarding the housing portion 40, the bracket 41 is fastened to the monitor 12 by screws at screw holes 41a, and the front surface cover 43 is placed thereon. In this regard, the lower surface covers 44 and 45 are previously fixed to the front surface cover 43. The lower surface covers are formed of the two covers of the lower surface cover 44 situated on the upper side and the lower surface cover 45 situated under the lower surface cover 44. The two lower surface covers 44 and 45 are slidable with respect to each other in the state in which they are stacked together. More specifically, the upper lower surface cover 44 is formed of a horizontal plate portion 44a and a vertical plate portion 44b extending integrally downwards from the rear edge thereof, thus exhibiting a substantially reverse-L-shaped sectional configuration. A plurality of thin and narrow guide grooves 44c are provided in the horizontal plate portion 44a to extend in the front-rear direction of the vehicle. Three guide grooves 44c are arranged side by side at equal intervals in the longitudinal direction of the horizontal plate portion 44a. Screw holes 44d are provided at the right and left side portions of the vertical plate portion 44b. The lower part of the lower-surface cover 45 is a substantially plate like member. On the upper surface of the lower surface cover 45, there are provided a plurality of engagement protrusions 45a at positions corresponding to the guide grooves 44c of the upper lower-surface cover 44. The lower surface cover 44 is fastened by screws to the inner side of the lower portion of the front surface cover 43 by means of screw holes 44d. The engagement protrusions 45a of the lower lower-surface cover 45 are respectively engaged with the guide grooves 44c of the upper lower-surface cover 44, whereby the lower surface covers 44 and 45 are vertically stacked together. At this time, the engagement protrusions 45a are able to slide (to be guided) toward the front-rear direction within the guide grooves 44c in a detachment-proof state, whereby the two lower surface covers 44 and 45 are slidable with respect to each other. At the lateral center of the lower edge of the front surface cover 43 and at the lateral center of the vertical plate portion 44b of the lower surface cover 44, there are respectively formed protruding operating portions 43a and 44e. When the lower surface cover 44 is fixed to the front surface cover 43, the two operating portions 43a and 44e are superimposed one upon the other to form an operating portion 50 for adjusting the angle of the housing portion 40. In this state, the bracket 41 is mounted to the support frame 31. More specifically, the hinge shafts 56 are passed through hinges 31i (provided at the upper ends of the right and left pillars 31a of the support frame 31) and through hinges 41b (provided at the right and left hand sides of the upper end of the bracket 41). The housing portion 40 is rotatable with respect to the support portion 30 around the hinge shafts 56, and the lower portion of the housing portion 40 is greatly displaced in the vehicle front-rear direction with respect to the base portion 20.

In the case in which the bracket 41 has been mounted to the support frame 31, a rear surface cover 42 is attached thereto from the front side (rear surface side) of those components. The rear surface cover 42 is of a gate-shaped configuration, and each of its right and left side walls is formed of an inner plate 42a and an outer plate 42b outwardly spaced part from the inner plate 42a by a predetermined distance, thereby constituting an inner/outer dual-plate structure. Each inner plate 42a has at its lower end a cutout 47 formed from the vehicle rear side toward the vehicle front side. The two cutouts 47 are of a step-like configuration whose cutout height is reduced in three stages from the rear side (front surface side). Each of the two cutouts 47 is formed of a large thickness cutout portion 47a, a medium thickness cutout portion 47b, and a small thickness cutout portion 47c arranged in that order from the rear side. The rear surface cover 42 is set in position with the right and left pillars 31a of the support frame 31 respectively arranged between the inner plate 42a and the outer plate 42b on each of the right-hand and the left-hand side. A top plate 42d of the rear surface cover 42 is adjacent to a vertical plate portion 32b of the L-shaped cover 32 (see FIG. 3). Due to this arrangement, the upper portion of the housing portion 40 covers the upper portion of the support portion 30 so as to be superimposed thereon on the rear surface side of the monitor unit 10. Further, the vertical plate portion 32b of the L-shaped cover 32 fits-between the right and left inner plates 42a (see FIG. 2). Swollen portions 42e formed on the right-hand and left-hand sides of the rear surface cover 42 cover the hinges 41b of the bracket 41. Then, the rear surface cover 42e and the front surface cover 43 are fixed to each other. More specifically, fit-engagement protrusions 43b of the front surface cover 43 are fit-engaged with fit-engagement holes 42f of the rear surface cover 42, and the rear surface cover 42 and the front surface cover 43 are fastened together by screws at screw holes 42g. At this time, the right and left sides of the two lower surface covers 44 and 45 are accommodated in the medium thickness cutout portions 47b of the rear cover 42 in the stacked state. Further, upright members 44f provided upright at the right and left ends of the horizontal plate portion 44a of the upper lower surface cover 44 fit into the large thickness cutout portions 47. As a result, the housing portion 40 is mounted to the support portion 30, and the monitor portion 13 is assembled.

By mounting the monitor portion 13, to which the support portion 30 and the housing portion 40 are pivoted, to the base portion 20 installed at the top of the seat back 3, the monitor unit is completed. More specifically, the hinge portion 31e of the support frame 31 is arranged between right and left hinge portions 22d of the base frame 22, and then the round-bar-like hinge shaft 55 is passed through the hinge portions 22d and 31e. At this time, the hinge cover portion 32f of the L-shaped cover 32 fits into the recess at the lateral center of the front end portion of the base portion 20. As a result, the monitor portion 13 is mounted to the base portion 20 and is capable of being tilted to the vehicle front side. Finally, the hinge covers 25 are fit-engaged with the upper surface cover 23 and the lower surface cover 24 to shield the hinge shaft 55. In this way, the monitor unit 10 is installed at the top of the seat back 3.

As shown in FIG. 2, at this time, the hinge shafts 56 (serving as the rotation shafts of the housing portion 40) are positioned at the rear surface of the housing portion 40, and do not outwardly protrude from the right and left ends thereof. Further, the support portion 30 does not exist on the right and left sides of the housing portion 40. Thus, as shown in FIG. 1, if the monitor unit 10 is of a size allowing accommodation in the headrest 4, the area of the housing portion 40 and, by extension, the area of the display surface 11 of the monitor 12 can be maximized with respect to the size of the monitor unit 10 as a whole.

The monitor portion 13 can be tilted (rotated) toward the vehicle front side around the hinge shaft 55 provided at the front end of the base portion 20 to be thereby brought into the retracted position. In order to retract the monitor unit 10 when the monitor unit 10 is in the normal use state as shown in FIG. 1, the headrest 4 is removed from the seat back 3 as shown in FIG. 2 while depressing the button 27 of the base portion 20. In this state, the monitor portion 13 is in the use position, in which it is erect on the base portion 20. That is, the display surface 11 of the monitor 12 is upright at the rear end of the base portion 20 while directed to the rear of the vehicle. In the use position, the fit-engagement pin 51 of the monitor portion 13 and the fit-engagement receiving member 52 of the base portion 20 are fit-engaged with each other, whereby the use position is maintained in a stable manner. A force larger than the fit-engagement force for the fit-engagement pin 51 and the fit-engagement receiving member 52 is applied to cancel the fit-engagement between the fit-engagement pin 51 and the fit-engagement receiving member 52, and the monitor portion 13 is forwardly tilted to the retracted position around the hinge shaft 55. The hinge shaft 55 serving as the rotation shaft of the monitor portion 13 is provided at the front end of the base portion 20. Due to this construction, when forwardly tilting the monitor portion from the use position to the retracted position, the monitor portion 13 can be rotated by 90 degrees or more. More specifically, as shown in FIG. 3, the monitor portion 13 is rotated by approximately 180 degrees to be placed in the retracted state indicated by the phantom lines of FIG. 3, in which it hangs at a position in front of the hinge shaft 55. The rear surface of the monitor portion 13 is formed in a protruding and recessed configuration that is substantially the same as that of the front surface of the seat back 3. Thus in a case in which the monitor portion 13 has been forwardly tilted to the retracted position, the rear surface of the monitor portion 13 is properly in contact with the front surface of the seat back 3. At the same time, the display surface 11 of the monitor 12 is substantially vertical.

When the monitor unit 10 is to be used, an operation reverse to the above-mentioned operation is performed to displace the monitor portion 13 from the retracted position to the use position. That is, the monitor portion 13 in the retracted position, in which it hangs while in contact with the front surface of the seat back 3, is rotated backwards around the hinge shaft 55, and is set erect on the base portion 20. When the monitor portion 13 is set erect on the base portion 20, the fit-engagement pin 51 is inevitably fit-engaged with the fit-engagement receiving member 52. The stays 5 are inserted into the insertion holes 21 so as to put the monitor portion 13 from above on the monitor unit 10 in the use position, thereby attaching the headrest 4 to the seat back 3.

Figure 6:
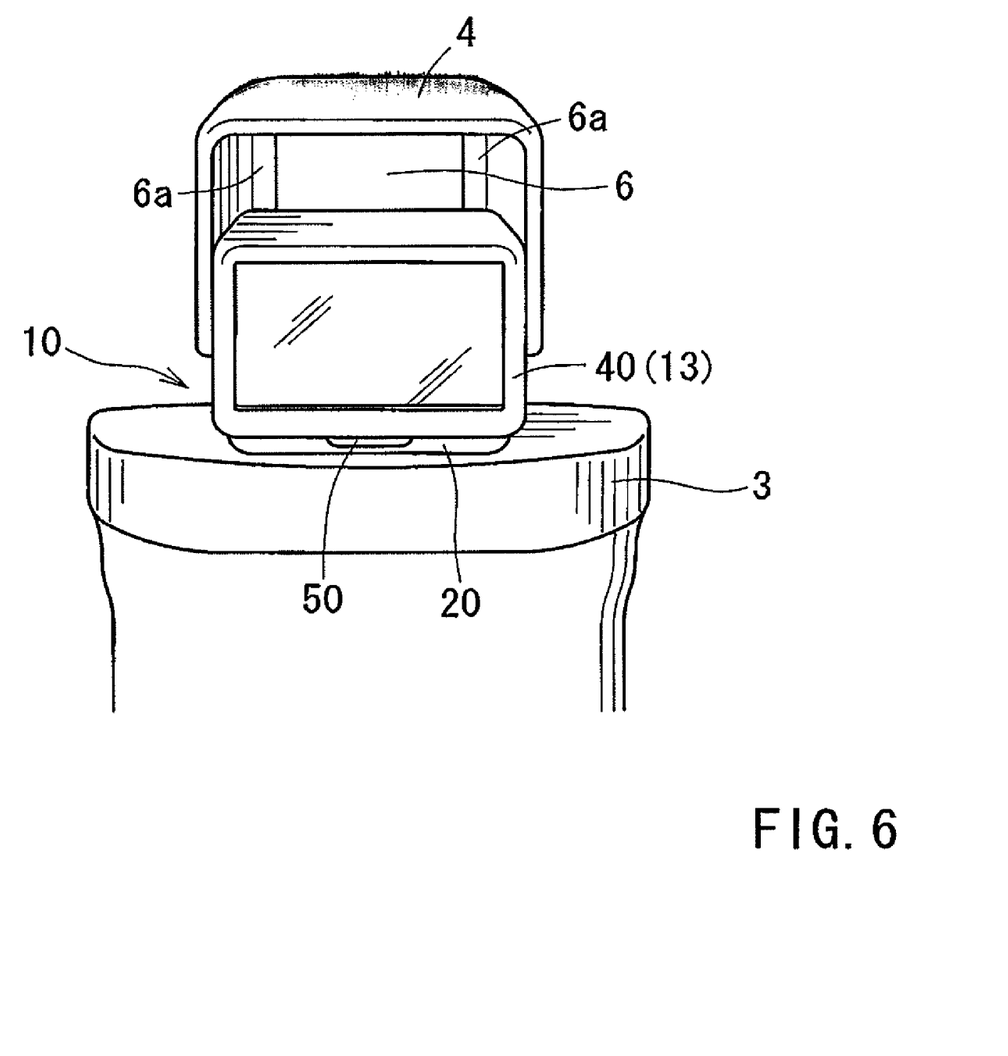
FIG. 6 A rear view of the vehicle seat with the headrest adjusted in height.

The button 27 is constantly urged outwardly to the side of the base portion 20. When the button 27 is depressed, the stays 5 of the headrest 4 can be inserted into the insertion holes 21 of the base portion 20. In other words, by canceling the depression of the button 27, the headrest 4 can be fixed in position without being detached from the monitor unit 10. The stay 5 on the button 27 side has a plurality of vertically arranged step portions 5a in the form of recesses. Through engagement of the button 27 with one of the step portions 5a, the height of the headrest 4 can be adjusted. As shown in FIGS. 4 and 6, a shield plate 6 is arranged on the upper inner surface of the headrest 4. Due to this construction, even when the headrest 4 as shown in FIG. 6 is raised from the monitor unit 10 by a predetermined amount and is fixed in position there, the shield plate 6 shields the interior of the headrest 4. The vertical dimension of the shield plate 6 is large enough to reliably shield the interior of the headrest 4 even when the headrest 4 is fixed at the highest position possible.

Next, the adjustment of the angle of the housing portion 40 with respect to the support portion 30 will be described. The angle adjustment of the housing portion 40 can be easily conducted with the finger on the operating portion 50. For example, when the housing portion 40 is in the vertical state indicated by the solid lines of FIG. 4, by rotating the lower portion of the housing portion 40 backwards around the hinge shafts 56, it can be adjusted so as to be obliquely inclined upwards as indicated by the phantom lines (chain double-dashed lines) in FIG. 4. At this time, as the housing portion 40 rotates, the top plate 42d of the rear surface cover 42 abuts the stay 31f of the support frame 31, whereby the rotation limit for the housing portion 40 is determined. Both small thickness cutout portions 47c of the rear surface cover 42 are formed as allowance spaces for avoiding contact of the right and left side walls of the rear surface cover 42 with the horizontal plate portion 31j of the support frame 31 when the housing portion 40 is rotated to the rotation limit. In order to restore the housing portion 40 from the inclined state to the vertical state, it is only necessary to push any portion on the front surface side of the housing portion 40 with the hand.

As the housing portion 40 rotates, a gap is generated between the housing portion 40 and the base portion 20. When the housing portion 40 is in the vertical state, both lower surface covers 44 and 45 are accommodated in the vertically stacked state between the right and left cutouts 47 of the rear surface cover 42. When the housing portion 40 is gradually rotated, solely the upper lower-surface cover 44 fixed to the front surface cover 43 is first integrally drawn out. When the housing portion 40 is further rotated, the engagement protrusions 45a abut the front ends of the guide grooves 44c, whereby a lower part of the lower-surface cover 45 is also drawn out. In the state in which the housing portion 40 has been rotated to the rotation limit, the two lower surface covers 44 and 45 are arranged side by side in the front-rear direction while shifted with respect to each other. As a result, the gap between the housing portion 40 and the base portion 20 is reliably shielded. At this time, a restricting member 45b formed by bending the lower lower-surface cover 45 downwards at the front edge thereof is in close proximity to a restricting member 31k formed by bending the horizontal plate portion 31j of the support frame 31 upwards at the rear edge thereof. Due to the presence of the two restricting members 31k and 45b, even if a load is applied that would cause further rotation of the housing portion 40 beyond the rotation limit angle, any further rotation is reliably restrained owing to the two restricting members 31k and 45b abutting each other.

When restoring the housing portion 40 to the vertical position from the inclined position, as the housing portion 40 rotates, the upper lower-surface cover 44 is first accommodated and stacked on the lower lower-surface cover 45. Next, at the point in time when the engagement protrusions 45a of the lower surface cover 45 abut the rear ends of the guide grooves 44c of the lower surface cover 44, the lower surface cover 44 and the lower surface cover 45 are accommodated integrally. As shown in FIG. 2, the upper surface of the base portion 20 is inclined downwards from the vehicle front side toward the vehicle rear side. The housing portion 40 rotates with respect to the support portion 30 along the upper surface of the base portion 20. In view of this, the lower surface of the housing portion 40 is also formed in an inclined configuration in conformity with the inclination of the base portion 20. As a result, a useless gap is not generated between the lower surface of the housing portion 40 and the upper surface of the base portion 20, and smooth rotation is possible.

The hinge shafts 56 existing between the support portion 30 and the housing portion 40 are provided on the upper portion of the rear surface of the housing portion 40, so, as shown in FIG. 4, the amount by which protrusion displacement is effected to the front side with the rotation of the housing portion 40 is very small. Thus, the shield plate 6 can be arranged as close to the monitor unit 10 as possible. As a result, it is possible to secure a large inner space within the headrest 4, thus achieving a high degree of freedom in terms of design. Further, recesses 6a are formed in both the right and left side portions of the shield plate 6. When the monitor unit 10 is in the normal use position as shown in FIG. 1, the swollen portions 42e and both side walls of the rear surface cover 42 are accommodated in the recesses 6a of the shield plate 6 (see FIG. 4). Thus, the shield plate 6 can be brought as close as possible to the housing portion 40, and the housing portion 40 can be rotated and accommodated smoothly without interfering with the shield plate 6. The shield plate 6 is arranged such that when the housing portion 40 is rotated to the rotation limit, the upper end of the rear surface of the housing portion 40 and the flat surface of the shield plate 6 are brought close to each other. Further, as shown in FIG. 4, the upper portion of the front surface of the housing portion 40 is formed in a configuration in conformity with the configuration of the inner side of the upper surface of the headrest 4 opposed thereto.

What is claimed is:

1. A monitor unit for a vehicle seat having a headrest, comprising:
    a base portion positioned at a top of a seat back; and
    a monitor portion including a monitor with a display surface for displaying images,
    wherein the monitor portion is pivotally connected to the base portion via a first hinge and rotatable in a front and rear direction between a use position at which the monitor portion is erect on the base portion and the display surface being directed to a rear direction, and a retracted position at which the monitor portion has been tilted toward a front direction around the first hinge,
    wherein the first hinge is positioned at a front end of the base portion,
    wherein the monitor portion is positioned below the first hinge when the monitor portion is in the retracted position,
    wherein the headrest is detachably fitted to the vehicle seat such that the headrest covers an upper portion of a front surface of the monitor portion when the headrest is attached to the vehicle seat and the monitor portion is in the use position, and
    wherein when the headrest is detached from the vehicle seat, the monitor portion is configured to be rotated by 90 degrees or more from the use position to the retracted position.

2. A monitor unit for a vehicle seat having a headrest according to claim 1, wherein a rear surface of the monitor portion generally corresponds to a front surface of the seat back, and wherein the rear surface of the monitor portion contacts the front surface of the seat back when the monitor portion is in the retracted position.

3. A monitor unit for a vehicle seat having a headrest according to claim 1, wherein the display surface of the monitor portion is generally vertical when the monitor portion is in the retracted position.

4. A monitor unit for a vehicle seat having a headrest according to claim 1, wherein the base portion and the monitor portion include fit-engaged retainers to maintain the use position of the monitor portion.

5. A monitor unit for a vehicle seat having a headrest according to claim 1, wherein the monitor portion further includes:

a support portion capable of supporting the monitor from behind and being rotatable with respect to the base portion, and a housing portion to accommodate the monitor, wherein the housing portion is pivotally connected to the support portion via a second hinge which is different from the first hinge, and is rotatable with respect to the support portion, and wherein the second hinge is provided on a rear surface of the housing portion so as not to protrude outwardly from right and left ends of the housing portion.

6. A monitor unit for a vehicle seat having a headrest according to claim 5, wherein the second hinge is on an upper portion of the rear surface of the housing portion, with a lower portion of the housing portion displaced with respect to the base portion, and wherein the housing portion includes a lower surface cover covering a gap between the housing portion and the base portion through rotation of the housing portion.

7. A monitor unit for a vehicle seat having a headrest according to claim 6, wherein cutouts capable of accommodating the lower surface cover are formed in right and left side walls of the housing portion, and wherein the cutouts have allowance spaces capable of avoiding contact of the housing portion with an inner frame of the support portion when the housing portion is inclined to a rotation limit for the housing portion with respect to the support portion.

8. A monitor unit for a vehicle seat having a headrest according to claim 6, wherein the lower surface cover is formed of two lower surface cover members, wherein, of the two lower surface cover members, one lower surface cover member is provided with a guide groove, the other lower surface cover member having an engagement protrusion to be engaged with the guide groove, and wherein when the housing portion is rotated with respect to the support portion, the two lower surface cover members are successively drawn out as the housing portion rotates, with the engagement protrusion sliding within the guide groove.

9. A monitor unit for a vehicle seat having a headrest according to claim 6, wherein the lower surface cover member is accommodated in an upper portion of an inner frame of the support portion, wherein a lower side of the lower surface cover has at an end edge on a vehicle front side thereof a restricting member protruding downwards, wherein the inner frame of the support portion has at an end edge on a vehicle rear side thereof a restricting member protruding upwards, and wherein a rotation limit for the housing portion is defined by the restricting member of the lower surface cover and the restricting member of the inner frame.

10. A monitor unit for a vehicle seat having a headrest according to claim 6, wherein an operating portion for rotating the housing portion is formed in a lower portion of the housing portion.

11. A monitor unit for a vehicle seat having a headrest according to claim 6, wherein the lower surface cover is formed of a plurality of plate members, and wherein the plate members are superimposed one upon another when accommodated and successively drawn out as the housing portion rotates, with the plate members being arranged side by side in the front and rear direction when the housing portion has been rotated to a rotation limit.

12. A monitor unit for a vehicle seat having a headrest according to claim 5, wherein when the headrest is fitted to the vehicle seat the upper portion of the front surface of the monitor portion conforms with an inner peripheral surface of the headrest.

13. A monitor unit for a vehicle seat having a headrest according to claim 12, wherein on the rear surface of the housing portion a portion covering the second hinge, which serves as the rotation shaft for the support portion, is formed as a swollen portion that protrudes to a vehicle front side, wherein a height of the headrest as measured from the top of the seat back is capable of being adjusted, wherein the headrest includes a shield plate shielding an inner structure of the headrest between an upper surface of the monitor portion and an upper surface of the headrest when the headrest is fixed in position in a state in which the headrest is raised from the monitor portion by a predetermined amount, wherein a recess is formed in the shield plate, and wherein the swollen portion on the rear surface of the housing portion is accommodated in the recess of the shield plate when the headrest is attached to the seat back.

14. A monitor unit for a vehicle seat having a headrest according to claim 13, wherein a stay for attaching the headrest to the seat back has a plurality of vertically arranged step portions in a form of recesses, and wherein a button is capable of setting a height position of the headrest through engagement with the step portions of the stay.

15. A monitor unit for a vehicle seat having a headrest according to claim 5, wherein the housing portion is capable of rotating with respect to the support portion along an upper surface of the base portion, and wherein the upper surface of the base portion and a lower surface of the housing portion have generally the same configuration.

16. A monitor unit for a vehicle seat having a headrest according to claim 5, wherein, on a rear surface side of the monitor portion, an upper portion of the housing portion covers an upper portion of the support portion so as to be superimposed thereon in the front and rear direction, and wherein the upper portions of the housing portion and the support portion, which are superimposed one upon the other, abut each other to define a rotation limit for the housing portion with respect to the support portion.

* * * * *